United States Patent
Osawa (10) Patent No.: US 11,594,983 B2
(45) Date of Patent: Feb. 28, 2023

(54) VIBRATION TYPE MOTOR, LENS APPARATUS, AND ELECTRONIC APPARATUS

(71) Applicant: CANON KABUSHIKI KAISHA, Tokyo (JP)

(72) Inventor: Kazuharu Osawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 321 days.

(21) Appl. No.: 16/910,773

(22) Filed: Jun. 24, 2020

(65) Prior Publication Data
US 2020/0403534 A1    Dec. 24, 2020

(30) Foreign Application Priority Data

Jun. 24, 2019    (JP) .............................. JP2019-116307

(51) Int. Cl.
*H02N 2/02*    (2006.01)
*G02B 7/02*    (2021.01)
*H02N 2/00*    (2006.01)

(52) U.S. Cl.
CPC .............. *H02N 2/026* (2013.01); *G02B 7/02* (2013.01); *H02N 2/006* (2013.01); *H02N 2/0065* (2013.01)

(58) Field of Classification Search
CPC ...... H02N 2/026; H02N 2/006; H02N 2/0065; H02N 2/0055; G02B 7/02; G02B 7/08
See application file for complete search history.

(56) References Cited

U.S. PATENT DOCUMENTS

| 7,129,620 | B2* | 10/2006 | Sakano | .................. | G02B 7/102 |
| | | | | | 396/85 |
| 10,243,486 | B2 | 3/2019 | Ninomiya | | |
| 10,425,019 | B2 | 9/2019 | Noguchi | | |
| 2017/0371125 | A1* | 12/2017 | Ninomiya | .............. | G02B 7/023 |
| 2018/0097459 | A1 | 4/2018 | Osawa | | |
| 2019/0341863 | A1 | 11/2019 | Ninomiya et al. | | |
| 2019/0363647 | A1 | 11/2019 | Takai et al. | | |
| 2019/0393807 | A1 | 12/2019 | Oikawa et al. | | |

FOREIGN PATENT DOCUMENTS

| JP | 2017-022957 A | 1/2017 |
| JP | 2017-200400 A | 11/2017 |

OTHER PUBLICATIONS

U.S. Appl. No. 16/909,087, Kazuharu Osawa, filed Jun. 23, 2020.

* cited by examiner

*Primary Examiner* — Emily P Pham
(74) *Attorney, Agent, or Firm* — Venable LLP (57) ABSTRACT

A vibration type motor includes a limiter configured to limit a distance between a movable guide member and a fixed guide member. The limiter has first, second, and third limiting areas. The first limiting area is disposed between a first roll member and a second roll member in one direction. The second limiting area is disposed on the same side as the second roll member with respect to the first roll member and distant from the second roll member in the one direction. The third limiting area is disposed on an opposite side of the second roll member with respect to the first roll member in the one direction. A length of the first limiting area in another direction orthogonal to the one direction is equal to or longer than that of each of the second limiting area and the third limiting area in the one direction.

19 Claims, 6 Drawing Sheets

VIBRATION TYPE MOTOR, LENS APPARATUS, AND ELECTRONIC APPARATUS

BACKGROUND OF THE INVENTION

Field of the Invention

The present invention relates to a vibration type motor usable for a lens barrel etc. in a camera.

Description of the Related Art

One proposed method which serves as one type of a vibration type motor vibrates a vibrator having a protrusion to generate an elliptical motion at the tip of the protrusion and to generate a driving force through the elliptical motion of the protrusion to drive a target. This type of vibration type motor is used, for example, to drive a lens apparatus.

Japanese Patent Laid-Open No. ("JP") 2017-22957 discloses a vibration type motor. The vibration type motor disclosed in JP 2017-22957 includes a movable unit including a vibrator and a movable guide member, and a fixed unit including a friction member and a fixed guide member. The movable guide member and the fixed guide member have guide grooves at positions facing each other, and guide the movable unit by holding a roll member between the guide grooves. The vibration type motor has a limiter that limits a distance between the guide grooves in the movable guide member and the fixed guide member to a certain value or less so that the roll member does not fall out of the guide groove.

JP 2017-200400 discloses a vibration type motor that includes a press member configured to press a vibrator against a friction member and disposed on a side surface of a movable unit in order to reduce the thickness of the vibration type motor.

The vibration type motor disclosed in JP 2017-22957 provides the limiter in a wide range on the side surface of the vibrator, limits the tilt of the movable unit, and prevents the roll member from falling off. When this limiter is applied to the vibration type motor disclosed in JP 2017-200400, the limiter interferes with another component such as the press member and it becomes necessary to dispose the press member and the limiter so that they do not interfere with each other. Hence, the vibration type motor becomes large, for example, in the width direction.

SUMMARY OF THE INVENTION

The present invention provides a compact and highly reliable vibration type motor, lens apparatus, and electronic apparatus.

A vibration type motor according to one aspect of the present invention includes a vibrator configured to vibrate in response to an application of voltage and to generate a driving force in a first direction, a friction member configured to frictionally contact the vibrator, a press member configured to press the vibrator against the friction member, a movable guide member having a guide groove, a fixed guide member disposed opposite to the movable guide member, two first roll members arranged along the first direction on the movable guide member, a single second roll member separated from the first roll members in a second direction orthogonal to the first direction, and a limiter configured to limit a distance between the movable guide member and the fixed guide member. The limiter has a first limiting area, a second limiting area, and a third limiting area. The first limiting area is disposed between the first roll member and the second roll member in the second direction. The second limiting area is disposed on the same side as the second roll member with respect to the first roll member and distant from the second roll member in the second direction. The third limiting area is disposed on an opposite side of the second roll member with respect to the first roll member in the second direction. A length of the first limiting area in the first direction is equal to or longer than that of each of the second limiting area and the third limiting area in the first direction.

Alternatively, the limiter has a first limiting area and a second limiting area. The first limiting area is disposed between the first roll member and the second roll member in the second direction. The second limiting area is disposed on the same side as the second roll member with respect to the first roll member and distant from the second roll member in the second direction. A length of the first limiting area in the first direction is equal to or longer than that of the second limiting area in the first direction. A predetermined component is disposed on a side of the first roll member with respect to the first limiting area in the second direction. The predetermined component overlaps the first limiting area in the first direction.

A lens apparatus and an electronic apparatus including the above vibration type motor also constitute other aspects of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

First Embodiment

Figures 1A, 1B:
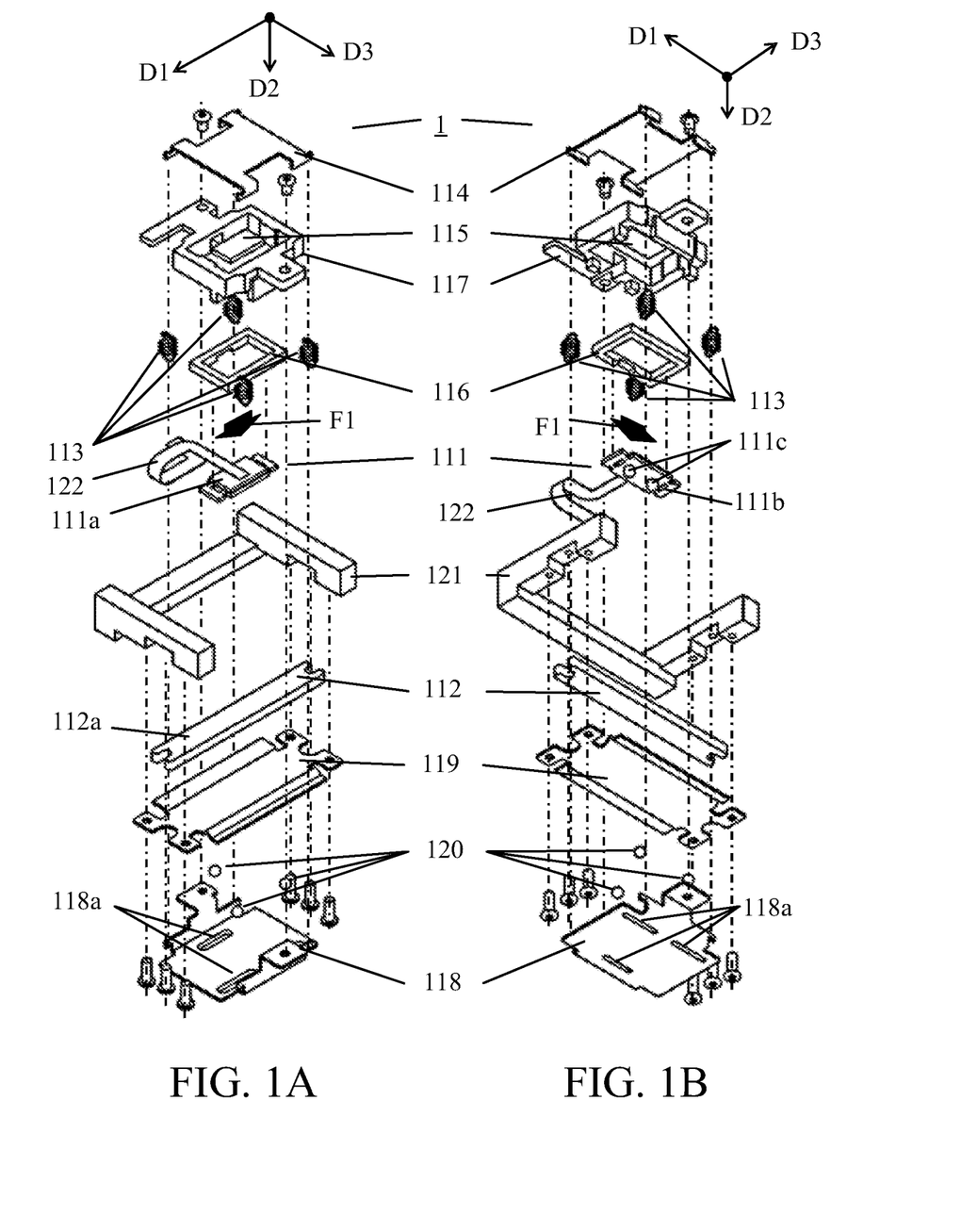
FIGS. 1A and 1B are exploded perspective views of a vibration type motor according to a first embodiment.
Figure 2A:
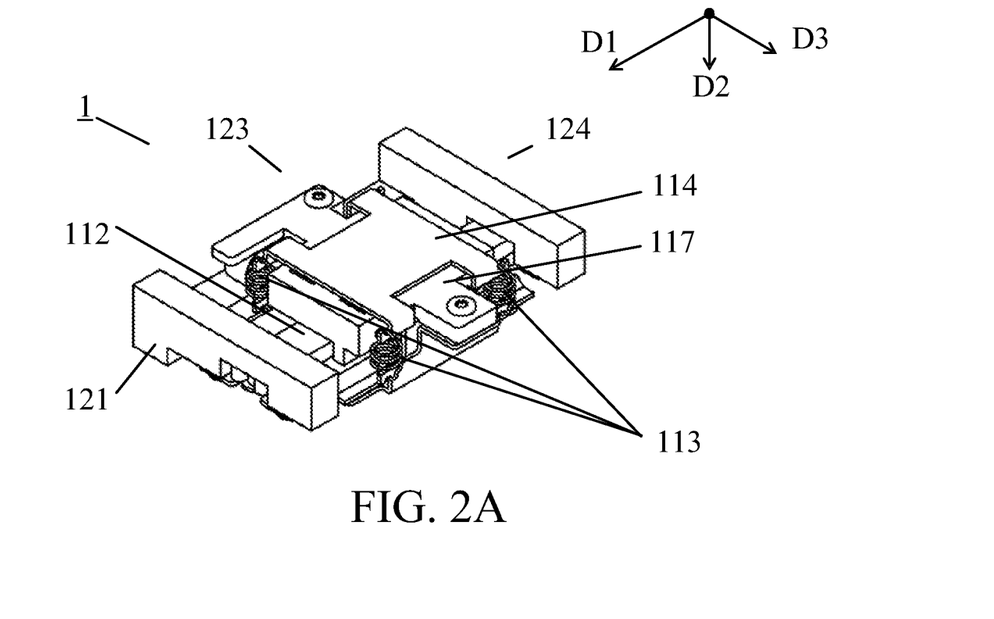
FIGS. 2A and 2B are perspective views of the vibration type motor in an assembled state according to the first embodiment.
Figure 2B:
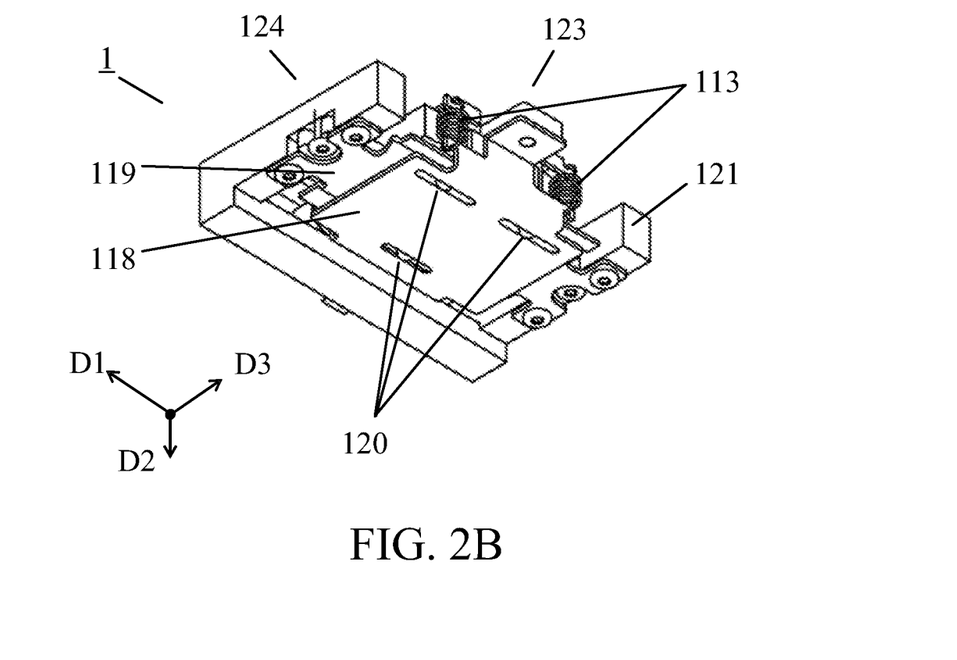

Referring now to FIGS. 1A, 1B, 2A, and 2B, a description will be given of a configuration of a vibration type motor 1 according to a first embodiment of the present invention. FIGS. 1A and 1B are exploded perspective views of the vibration type motor 1. FIGS. 2A and 2B are perspective views of the vibration type motor 1 in an assembled state.

The vibration type motor 1 mainly includes a vibrator 111, a friction member 112, a press member 113, a press plate 114, a buffer member 115, a vibrator holder 116, a movable frame 117, a movable guide member 118, a fixed guide member 119, a roll member 120, a base member 121, and a power feeder 122. The press member 113, the press plate 114, and the buffer member 115 are a press mechanism that generates a pressing force F1 for pressing the vibrator 111 against the friction member 112 and transmits it to the vibrator 111. The vibrator holder 116, the movable frame 117, the movable guide member 118, the fixed guide member 119, the roll member 120, and the base member 121 are a plurality of holding mechanisms for movably guiding the vibrator 111 relative to the friction member 112 in the driving direction D1 (first direction). The power feeder 122 supplies the power to the vibrator 111 (applies the voltage to the vibrator 111).

A movable unit 123 in the vibration type motor 1 includes the vibrator 111, the press member 113, the press plate 114, the buffer member 115, the vibrator holder 116, the movable frame 117, the movable guide member 118, and the power feeder 122. A fixed unit 124 in the vibration type motor 1 includes the friction member 112, the fixed guide member 119, and the base member 121. However, this embodiment is not limited to this embodiment. The movable unit 123 includes at least the movable guide member 118, one of the vibrator 111 and the friction member 112, a limiter 125, and a predetermined component. The fixing unit 124 includes at least the fixed guide member 119 and the other of the vibrator 111 and the friction member 112.

The vibrator 111 has a structure in which, for example, a plate-shaped piezoelectric element 111a and an elastic member 111b having two protrusions 111c are adhered to one another, vibrates in response to an application of the voltage, and generates a driving force in a driving direction D1. The piezoelectric element 111a includes, for example, PZT (lead zirconate titanate), and the elastic member 111b includes, for example, a metal plate. When a proper AC voltage is applied to the piezoelectric element 111a, an elliptical motion can be generated at the tip of the protrusion 111c. The friction member 112 includes, for example, a metal plate, and frictionally contacts the protrusions 111c of the vibrator 111 on a sliding surface 112a. The friction member 112 is screwed onto the base member 121.

The press member 113 includes, for example, four tension coil springs, and is disposed on the side surface of the movable frame 117 in the assembled state. Each press member 113 generates a tensile force, and presses the vibrator 111 in the pressing direction D2 by the pressing force F1 due to the resultant force. The vibration type motor 1 reduces the thickness of the movable unit 123 and becomes thinner by disposing the press member 113 on the side surface of the movable unit 123, as in the vibration type motor disclosed in JP 2017-200400.

The press plate 114 includes, for example, a metal plate. The buffer member 115 is made of a material that does not easily hinder the vibration of the vibrator 111, such as a felt. The press plate 114 transmits as the pressing force F1 the force generated by the press member 113 to the vibrator 111 via the buffer member 115.

The vibrator holder 116 includes, for example, a resin frame, is directly adhered to the vibrator 111, and holds the vibrator 111. The movable frame 117 includes a frame disposed around the vibrator holder 116, directly or indirectly holds the vibrator 111, and transmits the force generated by the vibrator 111 via a driving force transmitter (not shown) to a target (or an object to be driven). The movable guide member 118 and the fixed guide member 119 include, for example, metal plates. The fixed guide member 119 is disposed opposite to the movable guide member 118. The movable guide member 118 is fixed onto the movable frame 117 and has three guide grooves 118a that extend in the driving direction D1 of the vibration type motor 1. The three roll members 120 are arranged in the guide grooves 118a, and the movable member 123 including the vibrator 111 is movably guided in the driving direction D1 by holding the roll members 120 between the movable guide member 118 and the fixed guide member 119. The fixed guide member 119 is screwed onto the base member 121. A flexible printed circuit board serving as the power feeder 122 is attached to the piezoelectric element 111b, and the AC voltage is applied to the piezoelectric element 111b via the flexible printed circuit board.

In the above configuration, when the appropriate AC voltage is applied to the vibrator 111 to vibrate and generate the elliptical motion at the protrusions 111c, the driving force is generated in the driving direction D1 between the protrusion 111c of the vibrator 111 and the sliding surface 112a of the friction member 112. At this time, the movable unit 123 (the vibrator 111, the press member 113, the press plate 114, the buffer member 115, the vibrator holder 116, the movable frame 117, the movable guide member 118, and the power feeder 122) is integrally linearly moved in the driving direction D1.

Figure 6A:
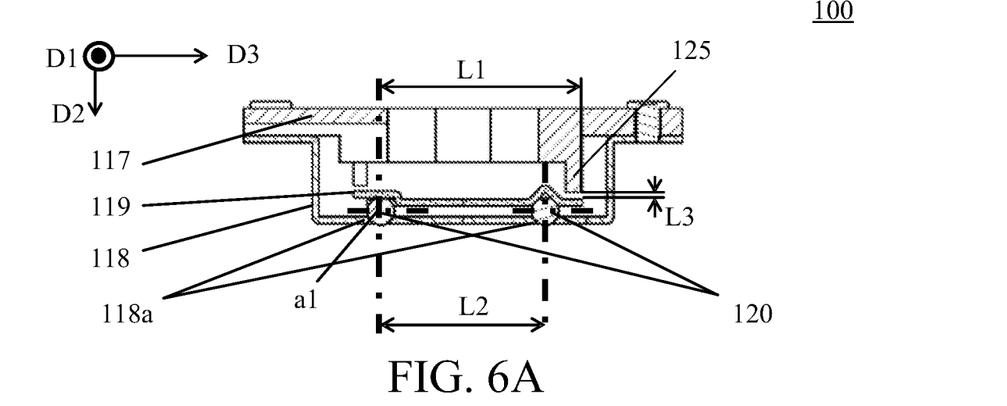
FIGS. 6A to 6C illustrate a configuration of a vibration type motor according to a comparative example.
Figure 6B:
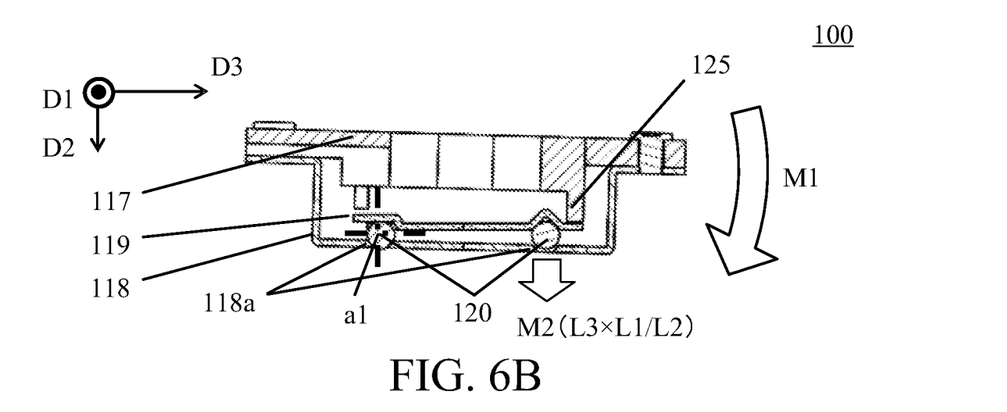
Figure 6C:
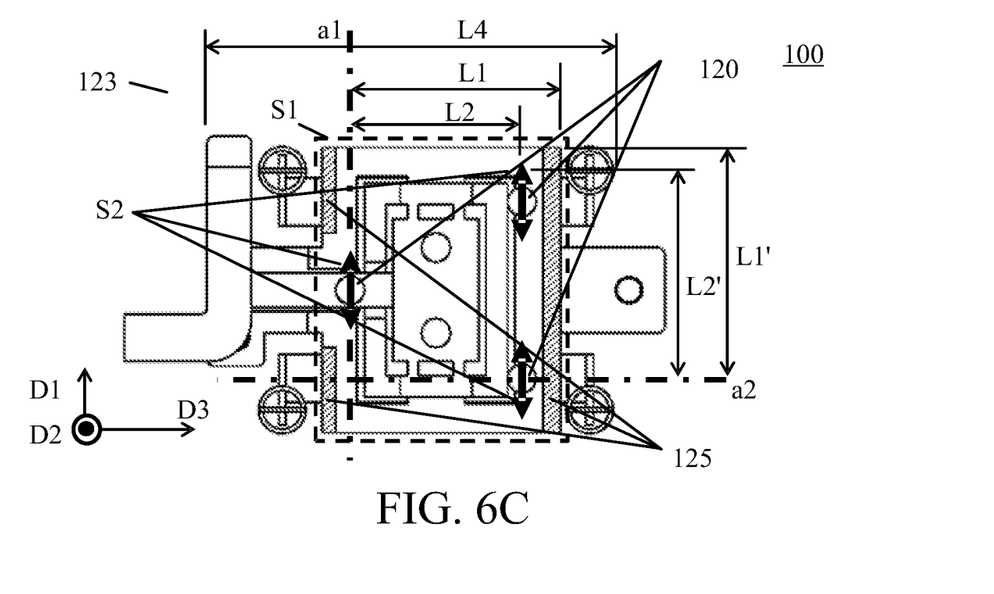

Referring now to FIGS. 6A to 6C, a description will be given of a mechanism for preventing the roll member 120 from falling off and problems in the vibration type motor 100 according to a comparative example. FIGS. 6A to 6C illustrate a configuration of a vibration type motor 100 according to a comparative example, in which the falling-off preventive mechanism disclosed in JP 2017-22957 is applied to the vibration type motor described in JP 2017-200400.

FIGS. 6A and 6B illustrate the movable frame 117, the movable guide member 118, the fixed guide member 119, and the roll member 120 viewed from the driving direction D1. As illustrated in FIG. 6A, the roll member 120 is disposed in the guide groove 118a in the movable guide member 118, and is sandwiched between the movable guide member 118 and the fixed guide member 119. In this configuration, if a distance between the movable guide member 118 and the fixed guide member 119 is significantly increased, for example, due to an impact, the roll member 120 may be derailed and fall out of the guide groove 118a. In order to prevent this problem, the movable frame 117 has the limiter 125 that limits the distance between the movable guide member 118 and the fixed guide member 119 so that the movable guide member 118 and the fixed guide member 119 do not separate from each other by a certain distance or longer. However, the location of the limiter 125 is improper in contrast to the behavior in which the movable guide member 118 tilts to the fixed guide member 119 as indicated by an arrow M1 in FIG. 6B, so the roll member 120 may not be prevented from falling out.

As illustrated in FIG. 6A, assume that L1 is a distance between an axis a1 passing through the roll member 120 and the limiter 125, L2 is a distance between the axis a1 and the roll member 120, and L3 is a distance between the limiter 125 and the fixed guide member 119. Then, the distance between the movable guide member 118 and the fixed guide member 119 in FIG. 6B has a maximum of L3×L2/L1 near the roll member 120 as indicated by an arrow M2. Hence, the distance L1 may be set longer than the distance L2, and the distance between the movable guide member 118 and the fixed guide member 119 may not increase near the roll member 120. For that purpose, the distance L1 may be longer than the distance L2, or the distance L1 and the distance L2 may have close values.

FIG. 6C illustrates the movable unit 123 and the roll member 120 in the vibration type motor 100 according to the comparative example viewed from the pressing direction D2. FIG. 6C omits the movable guide member 118. The limiter 125 is disposed similar to the vibration type motor disclosed in JP 2017-22957. S1 denotes an area covered with the limiter 125. S2 denotes a roll area (an area where the guide groove 118a extends) in which the roll member 120 rolls in the movable unit 123. FIGS. 6A and 6B illustrate an example in which the movable guide member 118 tilts around the axis a1. In practice, even if the movable guide member 118 tilts around a straight line passing through all the roll members 120 as a rotation axis, an arrangement for preventing the roll members 120 from falling off is required due to the action of the limiter 125.

In the vibration type motor disclosed in JP 2017-22957, the region S1 covered with the limiter 125 in FIG. 6C is disposed so as to completely cover the roll area (roll range) S2 of the roll member 120. In this configuration, even if the movable guide member 118 tilts around the straight line passing through any of the roll members 120 as the rotation axis, the distance between the movable guide member 118 and the fixed guide member 119 does not significantly increase near the roll member 120. For example, when the axis a1 is set as the rotation axis, the distance L1 between the axis a1 and the limiter 125 is longer than the distance L2 between the axis a1 and the roll member 120 as described above. Even when another axis a2 is set as the rotation axis, a distance L1' between the axis a2 and the limiter 125 is longer than a distance L2' between the axis a1 and the roll member 120.

From the above description, in order to prevent the roll member 120 from falling off even when the movable guide member 118 tilts around the straight line passing through any of the roll members 120 as the rotation axis, the region S1 covered with the limiter 125 when viewed from the pressing direction D2 may completely cover the roll region S2 of the roll member 120. This is the mechanism for preventing the roll member 120 from falling off. A description will now be given of a problem of the above configuration.

In JP 2017-22957, the substantially rectangular parallelepiped region S1 covered with the limiter 125 is disposed so as to completely cover the roll region S2 of the roll member 120. However, in the vibration type motor 100, the press member 113 and the like are disposed on the side surface of the movable unit 123 to reduce the thickness, as in the vibration type motor disclosed in JP 2017-200400. In the above configuration, the limiter 125 occupies a wide range and the press member 113 needs to be disposed so as to avoid the limiter 125. As a result, for example, a width L4 increases. As described above, it is difficult for the configuration according to the comparative example to reduce the size of the vibration type motor while preventing the roll members from falling off.

Figure 3A:
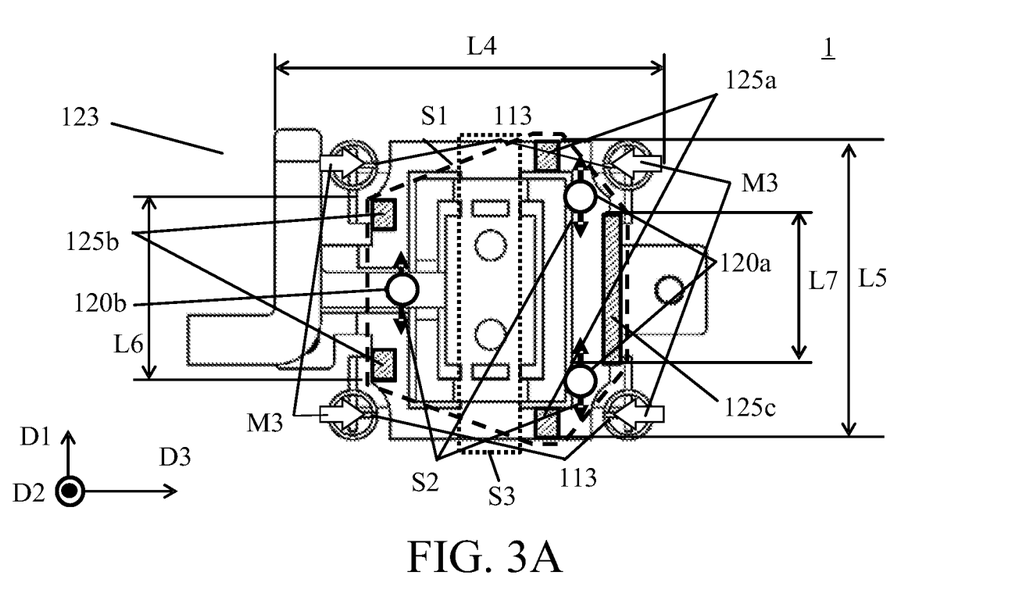
FIGS. 3A and 3B illustrate configurations of the vibration type motors according to the first and second embodiments.
Figure 3B:
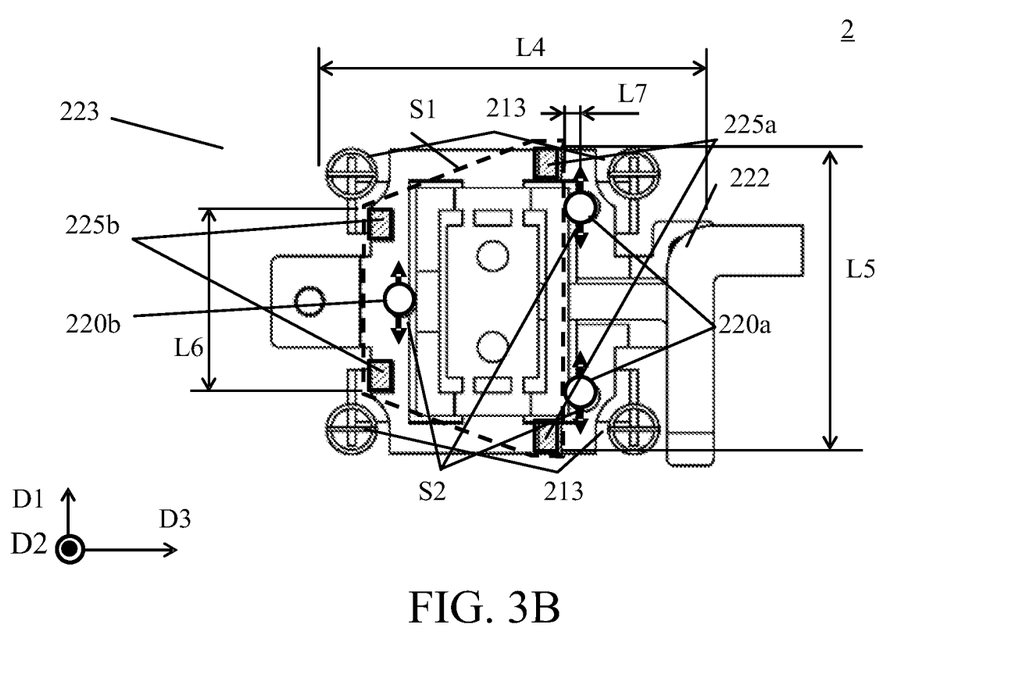

Referring now to FIGS. 3A and 3B, a description will be given of a configuration of the vibration type motor 1 according to this embodiment. FIG. 3A illustrates the movable unit 123 in the vibration type motor 1 viewed from the pressing direction D2. FIG. 3A omits the movable guide member 118. Now assume that a width direction D3 (second direction) is a direction orthogonal to the driving direction D1 when viewed from the pressing direction D2. In the vibration type motor 1, the limiter 125 is divided into three areas, a first limiting area 125a, a second limiting area 125b, and a third limiting area 125c. In the movable guide member 118, the two roll members 120 arranged along the driving direction D1 will be referred to as the first roll members 120a, and a single roll member 120 distant from the first roll members 120a in the width direction D3 will be referred to as a second roll member 120b.

The first limiting area 125a is an area of the limiter 125 which is disposed between the first roll member 120a and the second roll member 120b in the width direction D3. The second limiting area 125b is an area of the limiter 125 which is disposed in the width direction D3 in the same direction as the second roll member 120b when viewed from the first roll member 120a and outside the second roll member 120b. In other words, the second limiting area 125b is disposed on the same side as the second roll member 120b with respect to the first roll member 120a and distant from the second roll member 120b in the width direction D3. The third limiting area 125c is an area of the limiter 125 which is opposite to the second roll member 120b in the width direction D3 (located on the opposite side of the second roll member 120b with respect to the first roll member 120a). Of the first limiting area 125a, the second limiting area 125b, and the third limiting area 125c, the first limiting area has the longest length L5 among lengths L5, L6, and L7 between both ends in the driving direction of each area. In other words, the length L5 in the driving direction D1 of the first limiting area 125a is equal to or longer than each of the lengths L6 and L7 in the driving direction D1 of the second limiting area 125b and the third limiting area 125c ($L5 \geq L6$ and $L5 \geq L7$).

Next follows a description of an operation and an effect of the vibration type motor 1. As described above, in order to prevent the roll member 120 from falling off, the region S1 covered with the limiter 125 may completely cover the roll region S2 of the roll member 120 when viewed from the pressing direction D2. In the vibration type motor 1, the limiter 125 is divided into the first limiting area 125a, the second limiting area 125b, and the third limiting area 125c in the width direction D3, and the first limiting area 125a has the longest length among the lengths between both ends in the driving direction D1.

Due to this configuration, the region S1 covered with the limiter 125 has a substantially hexagonal shape (region S1 shown by a broken line in FIG. 3A), and follows the shape of the roll region S2 of the roll member 120 as illustrated in FIG. 3A. By thus forming the region S1 covered with the limiting area 125 into a substantially hexagonal shape, the range occupied by the limiter 125 necessary to prevent the roll member 120 from falling off can be minimized. By minimizing the range occupied by the limiter 125, the degree of freedom in disposing other members can be increased. The vibration type motor 1 can move the press member 113 to the inside in the width direction D3 as shown by an arrow M3, and the width L4 of the movable unit 123 can be reduced. As described above, this embodiment can provide the compact vibration type motor 1 while preventing the roll member 120 from falling off.

As illustrated in FIG. 3A, in the vibration type motor 1 of this embodiment, the press member 113, which is part of the movable unit 123, is located on the first roll member 120a side in the width direction D3 when viewed from the first limiting area 125a. The press member 113 overlaps the first limiting area 125a in the driving direction D1. Thereby, the press member 113 can be disposed to the inside in the width direction D3, and the width L4 of the movable unit 123 can be reduced.

Thus, the predetermined component that is part of the movable unit 123 may be disposed on the first roll member 120a side in the width direction D3 when viewed from the first limiting area 125a, and the predetermined component may overlap the first limiting area 125a in the driving direction D1. When the predetermined component is the press member 113 disposed on the side surface of the movable unit 123, the width L4 of the movable unit 123 can be reduced. The predetermined component is not limited to the press member 113. The predetermined component may be, as described later, the power feeder 122 described in a second embodiment, the connector 127 between the movable frame 117 and the movable guide member 118 described in a third embodiment, or a driving force transmitter 126 that transmits the driving force from the movable unit 123 to the target. When the predetermined component is a member disposed on the side surface of the movable unit 123, the width L4 of the movable unit 123 can be reduced.

The friction member 112 is disposed in the region S3 indicated by a dotted line in FIG. 3A. It is thus difficult to dispose the limiter 125 in the region S3. The first limiting area 125a illustrated in FIG. 3A has a shape in which the region S1 covered with the limiter 125 follows the shape of the roll region S2 as the position is closer to the first roll member 120a in the width direction D3. Hence, the first limiting area 125a may be disposed between the friction member 112 and the first roll member 120a in the width direction D3.

In the vibration type motor 1 according to this embodiment, the movable unit 123 includes the vibrator 111 and the fixed unit 124 includes the friction member 112, but the present invention is not limited to this embodiment. The movable unit 123 may include the friction member 112, and the fixed section 124 may include the vibrator 111. In the vibration type motor 1, the limiter 125 is provided to the movable frame 117, but the limiter 125 may be provided to any part of the movable unit 123. This embodiment has described an example in which a length between both ends of the first limiting area 125a in the driving direction D1 in the vibration type motor 1 is longer than each of the second limiting area 125b and the third limiting area 125c, but the present invention is not limited to this embodiment. For example, even if the length between both ends in one of the second limiting area 125b and the third limiting area 125c in the driving directions D1 is equal to the first limiting area 125a, it may be the longest among the limiting areas. This embodiment is not limited to the above examples regarding the driving principle of the vibrator 111 in the vibration type motor 1, the structure for holding and guiding the vibrator 111 and the friction member 112, the material of each member, and the like.

Second Embodiment

Referring now to FIG. 3B, a description will be given of a configuration of a vibration type motor 2 according to a second embodiment of the present invention. FIG. 3B illustrates a configuration of the vibration type motor 2 according to this embodiment. The configuration of the vibration type motor 2 is the same as that of the vibration type motor 1 except for a location of a limiter 225 provided to a movable unit 223, and a description thereof will be omitted.

A characteristic of the vibration type motor 2 will now be described. FIG. 3B illustrates the movable unit 223 in the vibration type motor 2 viewed from the pressing direction D2. FIG. 3B omits the movable guide member 218. The definitions of the width direction D3, the first roll member 220a, and the second roll member 220b are the same as those in the first embodiment. In the vibration type motor 2, the limiter 225 is divided into a first limiting area 225a and a second limiting area 225c. The first limiting area 225a is an area of the limiter 225 which is disposed between the first roll member 220a and the second roll member 220b in the width direction D3. The second limiting area 225b is an area of the limiter 225 which is disposed in the same direction as the second roll member 220b as viewed from the first roll member 220a and outside the second roll member 220b in the width direction D3.

In the first limiting area 225a and the second limiting area 225b, the length L5 of the first limiting area is the longest among the lengths L5 and L6 between both ends of each area in the driving direction. Arranged on the first roll member 220a side in the width direction D3 viewed from the first limiting area 225a are a press member 213 and a power feeder 222, which are part of the movable unit 223. The press member 213 and the power feeder 222 overlap the first limiting area 225a in the driving direction D1.

In this embodiment, the length L5 of the first limiting area 225a in the driving direction D1 may be equal to or longer than the length L6 of the second limiting area 225b in the driving direction D1 (the length L5 substantially coincides with or is longer than the length L6 (L5≥L6)). In this embodiment, in the width direction D3, the press member 213 and the power feeder 222 are arranged on the first roll member side of the first limiting area 225a, but the predetermined component may be disposed in addition to them. The predetermined component overlaps the first limiting area 225a in the driving direction D1.

Next follows a description of an operation and an effect of the vibration type motor 2. As described above, in order to prevent the roll member 220 from falling off, the region S1 covered with the limiter 225 when viewed from the pressing direction D2 may completely cover the roll region (roll range) S2 of the roll member 220. As illustrated in FIG. 3B, in the vibration type motor 2, the region S1 covered with the limiter 225 has a substantially trapezoidal shape, and follows the shape of the roll region S2 of the roll member 220.

In the vibration type motor 2 according to this embodiment, the roll region S2 slightly protrudes outside of the region S1. However, a protrusion amount L7 of the roll region S2 from the region S1 covered with the limiter 225 is slight as illustrated in FIG. 3B, and the influence is small on the likelihood of the falling-off of the roll member 220. In this manner, the range occupied by the limiter 125 necessary to prevent the roll member 120 from falling off can be minimized by substantially making trapezoidal the region S1 covered with the limiter 225 and by making small the protrusion amount L7 of the roll region S2. The above configuration enables the press member 213 and the power feeder 222 to bias toward the inside in the width direction D3, and the width L4 of the movable unit 223 to be reduced. This embodiment can provide a compact vibration type motor while preventing the roll member 220 from falling off.

In the vibration type motor 2 according to this embodiment, the members arranged on the first roll member 220a side in the width direction D3 when viewed from the first limiting area 225a are the press member 213 and the power feeder 222. Similar to the first embodiment, the predetermined component may be a connector between the movable frame 117 and the movable guide member 118 described in the following third embodiment and a driving force transmitter for transmitting the driving force from the movable unit 223.

In this embodiment, similar to the first embodiment, the first limiting area 225a may be disposed between the friction member 212 and the first roll member 220a in the width direction D3. In this embodiment, similar to the first embodiment, the movable unit 223 may include the friction member 212 and the fixed unit 224 may include the vibrator 211. In this embodiment, similar to the first embodiment, the limiter 225 may be provided on any part of the movable unit 223. In this embodiment, similar to the first embodiment, the length between both ends of the second limiting area 225b in the driving direction D1 may be equal to the first limiting area 225a. This embodiment is not limited to the above examples regarding the driving principle of the vibrator 211 in the vibration type motor 1, the structure for holding and guiding the vibrator 211 and the friction member 212, and the material of each member.

Third Embodiment

Figures 4A, 4B:
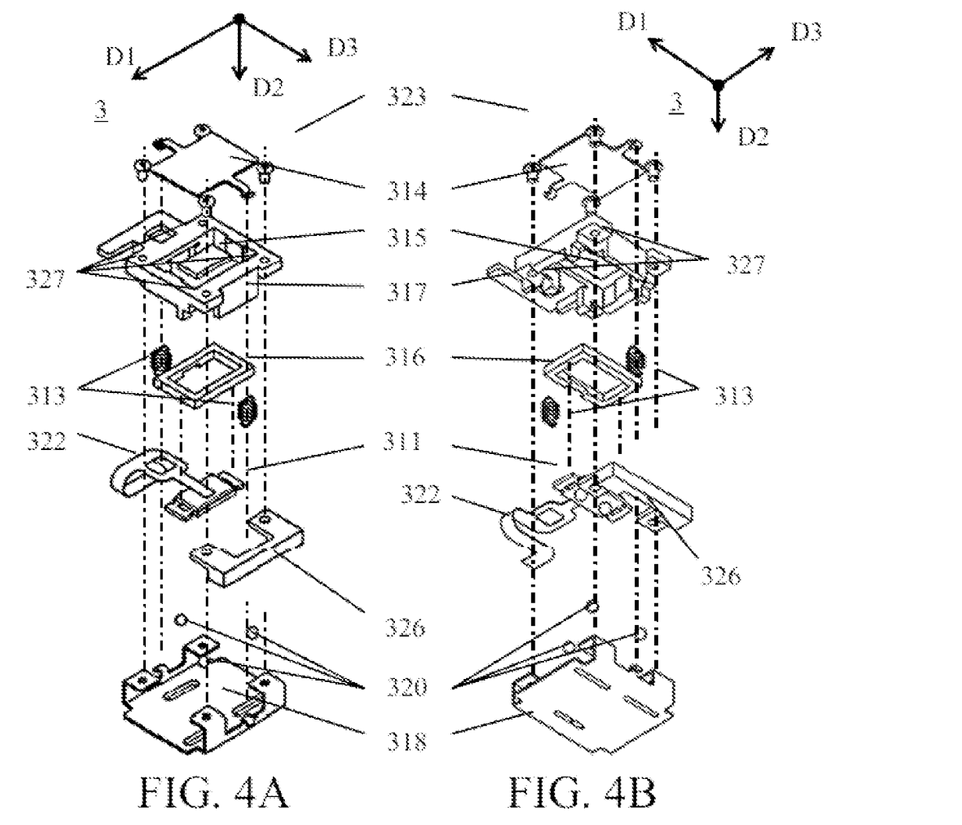
FIGS. 4A to 4C are exploded perspective views and a configuration diagram of a vibration type motor according to a third embodiment.
Figure 4C:
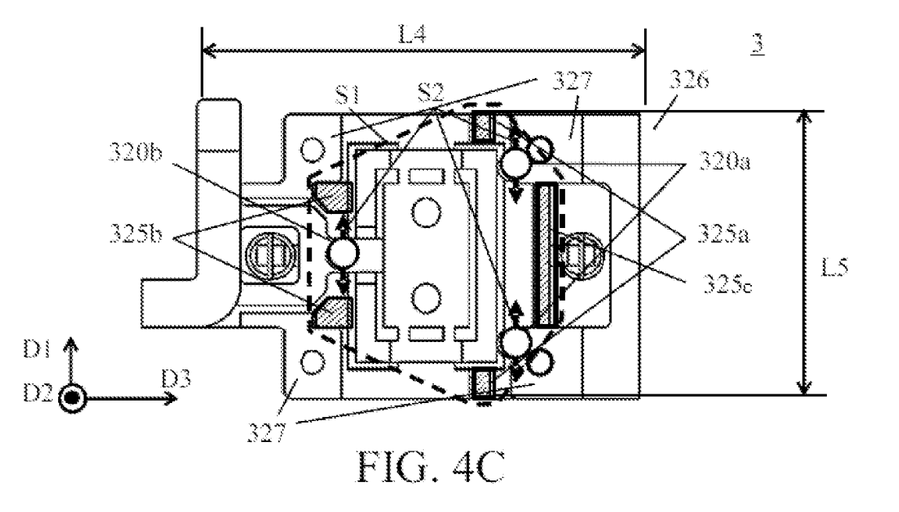

Referring now to FIGS. 4A to 4C, a description will be given of a configuration of a vibration type motor 3 according to a third embodiment of the present invention. The configuration of the vibration type motor 3 is the same as that of each of the vibration type motors 1 and 2 except for the structure of the movable unit 323, and a description thereof will be omitted.

FIGS. 4A and 4B are exploded perspective views of the movable unit 323 of the vibration type motor 3. The movable unit 323 in the vibration type motor 3 includes, in addition to the movable unit 123 described in the vibration type motor 1, a driving force transmitter 326 that transmits to a target a driving force in the driving direction D1 generated when the vibrator 311 is vibrated. The movable unit 323 includes a vibrator 311, a press member 313, a press plate 314, a buffer member 315, a vibrator holder 316, a movable frame 317, a movable guide member 318, a power feeder 322, and a driving force transmitter 326, similar to the vibration type motor 1.

In the vibration type motor 3, the press member 313 includes two tension coil springs. The driving force transmitter 326 is sandwiched between the movable frame 317 and the movable guide member 318. The driving force transmitter 326 is fixed onto or engaged with (fitted into) the target (not shown) and transmits the driving force. The movable frame 317 and the movable guide member 318 are screwed by the connector 327. In the above configuration, the driving force transmitter 326 and the connection unit 327 are disposed on the side surface of the movable unit 323. Each member other than the above description is the same as that of each of the vibration type motors 1 and 2, and a description thereof will be omitted.

Next follows a description of a characteristic of the vibration type motor 3. FIG. 4C illustrates the movable unit 323 of the vibration type motor 3 viewed from the pressing direction D2. FIG. 4C omits the movable guide member 318. The definitions of the width direction D3, the first roll member 320a, and the second roll member 320b are the same as those in the first embodiment. The location of the limiter 325 in the vibration type motor 3 is the same as that of the vibration type motor 1. Arranged on the first roll member 320a side in the width direction D3 when viewed from the first limiting area 325a are a driving force transmitter 326 and a connection unit 327, which are part of the movable unit 323. The driving force transmitter 326 and the connection unit 327 overlap the first limiting area 325a in the driving direction D1.

Next follows a description of an operation and an effect of the vibration type motor 3. As described above, in order to prevent the roll members 320 (the first roll members 320a and the second roll member 320b) from falling off, the region S1 covered with the limiter 325 when viewed from the pressing direction D2 may completely cover the roll region S2 of the member 120. In the vibration type motor 3, similar to the vibration type motor 1, the limiter 325 is divided in the width direction D3 into a first limiting area 325a, a second limiting area 325b, and a third limiting area 325c. The length L5 of the first limiting area 325a is the longest among the lengths between both ends in the driving direction D1. Due to the above configuration, the region S1 covered with the limiting area 325 has a substantially hexagonal shape. Hence, the driving force transmitter 326, which is part of the movable unit 323, and the connector 328 between the movable frame 317 and the movable guide member 318 can be biased to the inside in the width direction, and the width L4 of the movable unit 323 in the width direction can be reduced.

In this embodiment, similar to the first embodiment, the first limiting area 325a may be disposed between the friction member 312 and the first roll member 320a in the width direction D3. In this embodiment, similar to the first embodiment, the length between both ends of each of the second limiting area 325b and the third limiting area 325c in the driving direction D1 may be equal to the length of the first limiting area 325a. In the vibration type motor 3 according to this embodiment, the driving force transmitter 326 is disposed as a separate member from the movable frame 317, but the present invention is not limited to this embodiment. The movable frame 317 and the driving force transmitter 326 do not need to be separate members, and may be part of any member of the movable unit 323 that is connected to the target. In this embodiment, similar to the first embodiment, the movable unit 323 may include the friction member 312 and the fixed unit 324 may include the vibrator 311. In this embodiment, similar to the first embodiment, the limiter 325 may be provided to any part of the movable unit 323. This embodiment is not limited to the above examples regarding the driving principle of the vibrator 311 in the vibration type motor 3, the structure for holding and guiding the vibrator 311 and the friction member 312, the material of each member, and the like.

Fourth Embodiment

Figure 5A:
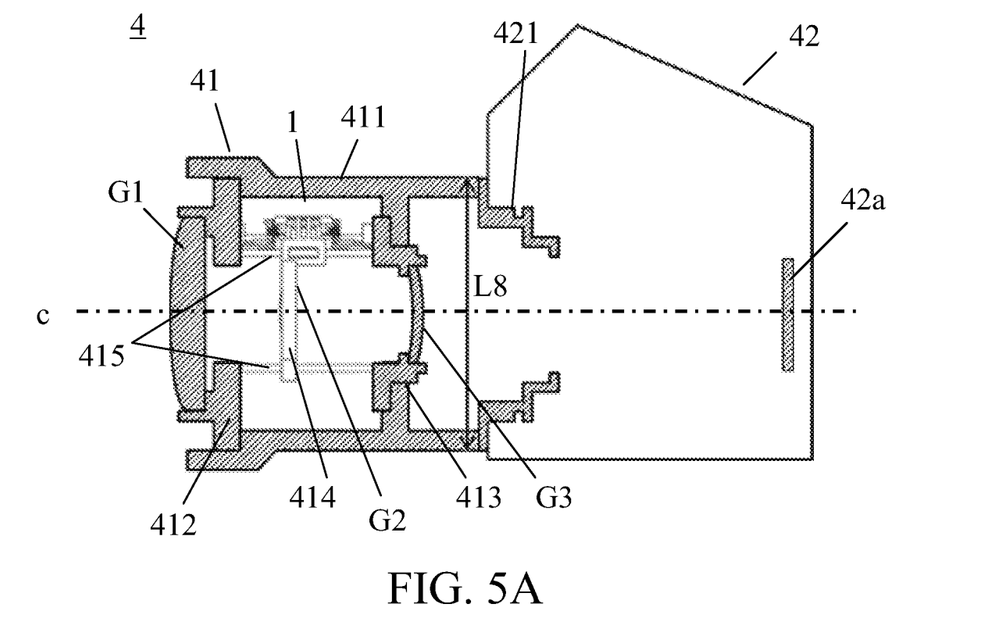
FIGS. 5A and 5B illustrate a configuration of an image pickup apparatus according to a fourth embodiment.
Figure 5B:
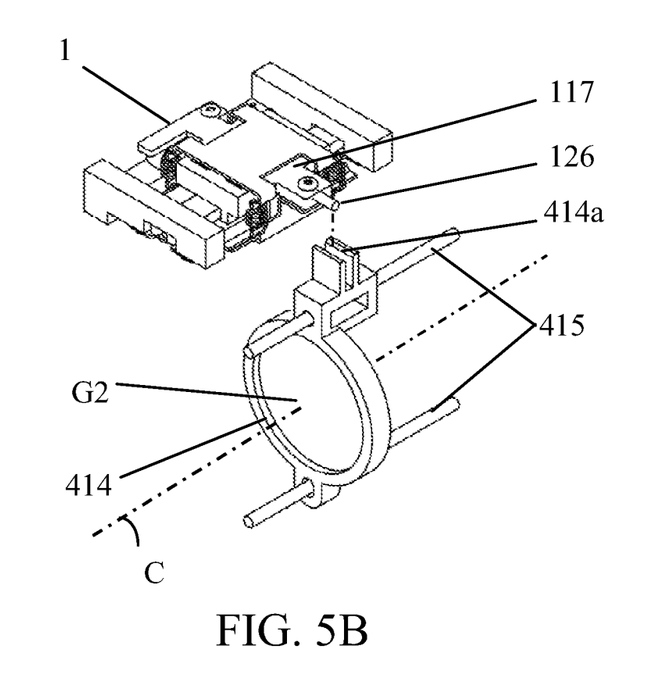

Referring now to FIGS. 5A and 5B, a description will be given of an image pickup apparatus according to a fourth embodiment of the present invention. FIGS. 5A and 5B illustrate a configuration of an image pickup apparatus 4. FIG. 5A is a sectional view of the image pickup apparatus 4, and FIG. 5B is an exploded perspective view of principal part of the image pickup apparatus 4. The image pickup apparatus 4 includes the vibration type motor 1 according to the first embodiment in an example. The image pickup apparatus 4 includes a camera body (image pickup apparatus body) 42 and a lens barrel (lens apparatus) 41 that is detachable from the camera body 42. However, this embodiment is not limited to this example, and is also applicable to an image pickup apparatus in which a camera body and a lens barrel are integrated with each other.

The camera body 42 includes an image sensor 42a. The image sensor 42a includes a CMOS sensor or a CCD sensor, photoelectrically converts an optical image (object image) formed via an image pickup optical system (lenses G1, G2, and G3) in the lens barrel 41, and outputs image data. A mount 421 of the camera body 42 has a bayonet for attaching the lens barrel 41 to the camera body 42.

The lens barrel 41 has a fixed barrel 411 and contacts a flange unit of the mount 421. The fixed barrel 411 and the mount 421 are fixed to each other by screws (not shown). A front barrel 412 holding the lens G1 and a rear barrel 413 holding the lens G3 are fixed to the fixed barrel 411. The lens barrel 41 includes a lens holding frame 414 that holds the lens G2. The lens holding frame 414 is linearly movably held by a guide bar 415 held by the front barrel 412 and the rear barrel 413. The vibration type motor 1 is fixed to the rear lens barrel 413 with screws (not shown) or the like.

FIG. 5B illustrates the vibration type motor 1, the lens G2, the lens holding frame 414, and the guide bar 415, which are main parts of the image pickup apparatus 4. The movable frame 117 in the vibration type motor 1 includes a driving force transmitter 126 for transmitting the driving force of the vibration type motor 1 to the lens holding frame 414. The driving force transmitter 126 is fitted in and connected to an engagement unit 414*a* provided to the lens holding frame 414. In such a configuration, when the vibration type motor 1 is driven, the driving force of the vibration type motor 1 is transmitted to the lens holding frame 414 via the movable frame 117 and the driving force transmitter 126. The lens holding frame 414 linearly moves while being guided by the guide bar 415. As described above, in this embodiment, the lens barrel 41 can drive the lens G2 constituting the image pickup optical system along the optical axis C using the vibration type motor 1.

Next follows a description of a characteristic, an operation, and an effect of the lens barrel 41. The lens barrel 41 uses the vibration type motor 1 for driving the lens. In the lens barrel 41 using the vibration type motor 1, a radial size L8 is affected by the thickness and width of the vibration type motor 1. Hence, by using the vibration type motor 1 having a reduced thickness and a reduced width, the radial size L8 of the lens barrel 41 can be reduced. In addition, by using the vibration type motor 1 in which the roll member 120 is prevented from falling off and configured to drive the lens, the reliability against a drop impact or the like can be further secured. This embodiment can provide a compact and highly reliable lens apparatus.

This embodiment drives the image pickup optical system (lens) by the vibration type motor, but may drive a target other than the image pickup optical system (lens) in the image pickup apparatus. For example, a configuration may be used in which the image sensor is set as the target and the above vibration type motor is used to drive the image sensor in a direction orthogonal to the optical axis of the image pickup optical system. The electronic apparatus to which the present invention is applicable is not limited to an image pickup apparatus, and the vibration type motor described above may be used to drive a target that is a component in an electronic device other than the image pickup apparatus.

Each embodiment can provide a compact and highly reliable vibration type motor, lens apparatus, and electronic apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-116307, filed on Jun. 24, 2019, which is hereby incorporated by reference herein in its entirety.

What is claimed is:

1. A vibration type motor comprising:
   a vibrator configured to vibrate in response to an application of voltage and to generate a driving force in a first direction;
   a friction member configured to frictionally contact the vibrator;
   a press member configured to press the vibrator against the friction member;
   a movable guide member having a guide groove;
   a fixed guide member disposed opposite to the movable guide member;
   two first roll members arranged along the first direction on the movable guide member;
   a single second roll member separated from the two first roll members in a second direction orthogonal to the first direction; and
   a limiter configured to limit a distance between the movable guide member and the fixed guide member,
   wherein the limiter has a first limiting area, a second limiting area, and a third limiting area,
   wherein the first limiting area is disposed between the two first roll members and the single second roll member in the second direction,
   wherein the second limiting area is disposed on the same side as the single second roll member with respect to the two first roll members and distant from the single second roll member in the second direction,
   wherein the third limiting area is disposed on an opposite side of the single second roll member with respect to the two first roll members in the second direction, and
   wherein a length of the first limiting area in the first direction is equal to or longer than that of each of the second limiting area and the third limiting area in the first direction.

2. The vibration type motor according to claim 1, wherein a predetermined component is disposed on a side of the two first roll members with respect to the first limiting area in the second direction, and
   wherein the predetermined component overlaps the first limiting area in the first direction.

3. The vibration type motor according to claim 2, wherein the predetermined component is the press member.

4. The vibration type motor according to claim 2, wherein the predetermined component is a connector configured to connect the movable guide member and a movable frame that directly or indirectly holds the vibrator.

5. The vibration type motor according to claim 2, wherein the predetermined component is a driving force transmitter configured to transmit a driving force to a target of the vibration type motor.

6. The vibration type motor according to claim 2, wherein the predetermined component is a power feeder configured to apply the voltage to the vibrator.

7. The vibration type motor according to claim 2, wherein a movable unit includes at least the movable guide member, one of the vibrator and the friction member, the limiter, and the predetermined component, and
   wherein a fixed unit includes at least the fixed guide member and the other of the vibrator and the friction member.

8. The vibration type motor according to claim 1, wherein the first limiting area is disposed between the friction member and the two first roll members in the second direction.

9. A lens apparatus comprising:
   the vibration type motor according to claim 1; and
   an optical system to be driven by the vibration type motor.

10. An electronic apparatus comprising:
    the vibration type motor according to claim 1; and
    a target to be driven by the vibration type motor.

11. A vibration type motor comprising:
a vibrator configured to vibrate in response to an application of voltage and to generate a driving force in a first direction;
a friction member configured to frictionally contact the vibrator;
a press member configured to press the vibrator against the friction member;
a movable guide member having a guide groove;
a fixed guide member disposed opposite to the movable guide member;
two first roll members arranged along the first direction on the movable guide member;
a single second roll member separated from the two first roll members in a second direction orthogonal to the first direction; and
a limiter configured to limit a distance between the movable guide member and the fixed guide member,
wherein the limiter has a first limiting area and a second limiting area,
wherein the first limiting area is disposed between the two first roll members and the single second roll member in the second direction,
wherein the second limiting area is disposed on the same side as the single second roll member with respect to the two first roll members and distant from the single second roll member in the second direction,
wherein a length of the first limiting area in the first direction is equal to or longer than that of the second limiting area in the first direction,
wherein a predetermined component is disposed on a side of the two first roll members with respect to the first limiting area in the second direction, and
wherein the predetermined component overlaps the first limiting area in the first direction.

12. The vibration type motor according to claim 11, wherein the predetermined component is the press member.

13. The vibration type motor according to claim 11, wherein the predetermined component is a connector configured to connect the movable guide member and a movable frame that directly or indirectly holds the vibrator.

14. The vibration type motor according to claim 11, wherein the predetermined component is a driving force transmitter configured to transmit a driving force to a target of the vibration type motor.

15. The vibration type motor according to claim 11, wherein the predetermined component is a power feeder configured to apply the voltage to the vibrator.

16. The vibration type motor according to claim 11, wherein a movable unit includes at least the movable guide member, one of the vibrator and the friction member, the limiter, and the predetermined component, and
wherein a fixed unit includes at least the fixed guide member and the other of the vibrator and the friction member.

17. The vibration type motor according to claim 11, wherein the first limiting area is disposed between the friction member and the two first roll members in the second direction.

18. A lens apparatus comprising:
the vibration type motor according to claim 11; and
an optical system to be driven by the vibration type motor.

19. An electronic apparatus comprising:
a vibration type motor according to claim 11; and
a target to be driven by the vibration type motor.

* * * * *